Oct. 16, 1934.    A. H. SHOEMAKER    1,977,018
METHOD OF CONSTRUCTING PNEUMATIC TIRES
Filed April 11, 1931
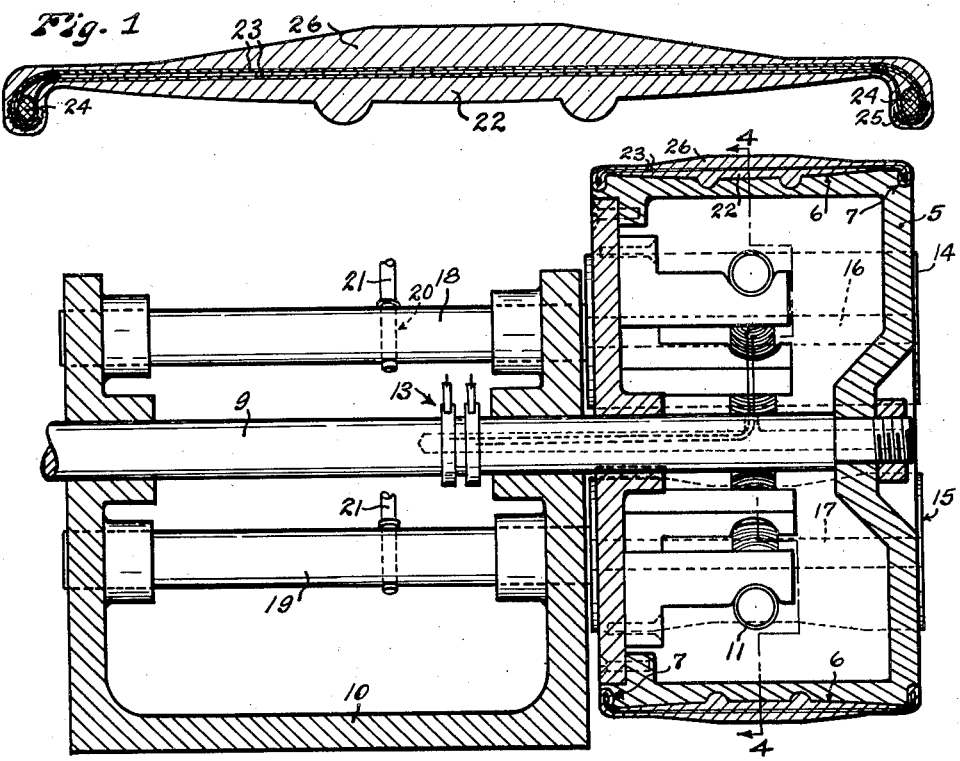
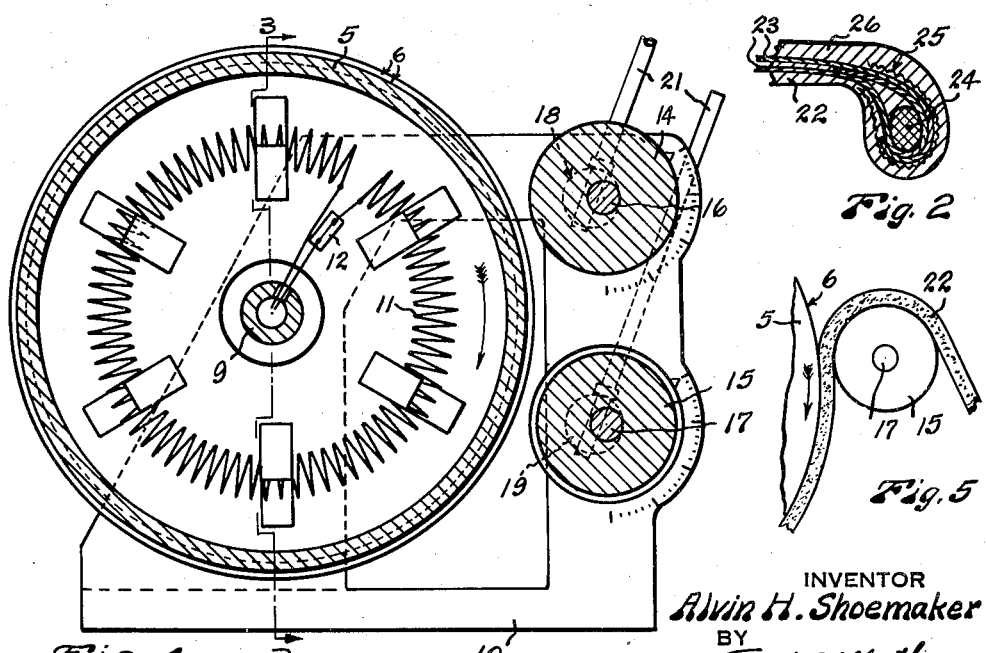
INVENTOR
Alvin H. Shoemaker
BY
Fred C. Matheny
ATTORNEY Patented Oct. 16, 1934

1,977,018

UNITED STATES PATENT OFFICE 1,977,018

METHOD OF CONSTRUCTING PNEUMATIC TIRES

Alvin H. Shoemaker, Seattle, Wash.

Application April 11, 1931, Serial No. 529,397

10 Claims. (Cl. 154—14)

My invention relates to methods of building up pneumatic tires from raw rubber preparatory to curing or vulcanizing the same and to improvements in the apparatus used in carrying out my method.

A primary object of my invention is to devise a method by which a tire of raw or uncured rubber and reinforcing material may be very quickly and easily and cheaply built up with extreme accuracy and in such a manner that the rubber therein is very evenly distributed and the reinforcing therein very evenly tensioned.

Another primary object of my invention is to devise a method by which heat may be used during the building up process of a tire to soften the raw rubber and render it plastic whereby it may be rolled and worked so as to greatly benefit the rubber and increase the ultimate wearing qualities of the tire.

Another object of the invention is to devise a method whereby successive layers of rubber are applied to the tire without danger of forming air pockets in said rubber thereby greatly reducing manufacturing losses due to defective tires.

Another object of the invention is to devise a method and provide means whereby a tire may be built up substantially flat in cross section thereby greatly reducing the expense of this step in the process of manufacture.

Other and more specific objects will be apparent from the following description taken in connection with the accompanying drawing.

In the drawing Figure 1 is a view in cross section of a tire built up in accordance with my method.

Fig. 2 is a fragmentary sectional view on a larger scale illustrating the bead construction of this tire.

Fig. 3 is a vertical section substantially on a broken line 3—3 of Fig. 4 of apparatus which may be used in carrying out my method, a completely formed tire being shown on the periphery of a drum which is embodied in this apparatus.

Fig. 4 is a sectional view of the same substantially on broken line 4—4 of Fig. 3, the tire being omitted.

Fig. 5 is a diagrammatic view illustrating the manner of applying the rubber to the tire to avoid trapping air between successive layers of such rubber.

In the construction of pneumatic tire casings, it is first necessary to build up the casing from raw rubber and reinforcing material and then to cure or vulcanize this casing by application of heat. It is common practice to build up these casings in the arcuate shape of the final product and to distribute the raw rubber and cords or other reinforcement as evenly as possible around the casing, which will ordinarily be of arcuate cross section. This method is usually carried out without the application of heat and often results in unequal distribution of the raw rubber and unequal tensioning of different parts of the reinforcement thereby producing defective or imperfect tires.

In accordance with my invention I build the tire casing up on a heated form which renders the rubber plastic and readily workable and I roll and mill this plastic rubber in the process of building up the casing in such a manner as to benefit the rubber and increase its wearing qualities and at the same time distribute said rubber very evenly around and throughout the tire. I also provide a method by which the tire may be built up substantially flat. This simplifies the building up process, makes it easier to roll the material into a desired shape and reduces the cost of this step in the process of manufacture of the tire.

My process of building up the tire flat is further especially adapted to the construction of tires of so called radial cord type in which no longitudinal or diagonal binder is provided. In tires of this type ordinary cord fabric is used as the reinforcing medium and this fabric is cut and placed so that the cords run straight across the tire from one bead portion to the other leaving the tire free to stretch longitudinally. The bead members in this tire are also longitudinally extensible to a sufficient extent to permit the tire to be readily removed from or stripped off of the form on which the tire is built by insertion of a tool between the tire and the form after the building of the tire is completed.

The apparatus used in carrying out my method of construction may comprise a substantially cylindrical drum 5 having a slightly concave peripheral surface 6 on which the tire may be built. Grooves 7 are provided at the edges of the drum for the reception of the bead portions of a tire. The drum 5 is supported for rotation on a shaft 9 which may be journaled in a frame 10. Any suitable means, not shown, may be provided for rotating the shaft 9 to drive the drum 5 at a desired speed. The drum 5 is preferably provided with means whereby the same may be internally heated as with an electric heating element 11, which is controlled by thermostat switch 12 whereby the heat within the drum may be automatically controlled within predetermined limits. The temperature of the drum will preferably be maintained high enough to semivulcanize the surface which is in contact with the drum rendering this surface tough and capable of holding its shape. With this degree of heat the whole mass of rubber becomes very plastic and easily worked. Circuit wires from the thermostatic switch 12 may extend outwardly through the shaft 9 and connect with a source of current through suitable ring and brush mechanism indicated at 13.

A suitable number of rollers 14 and 15 are movably mounted in close proximity to the periphery of the drum 5 so that they may be brought into contact with tire casings which are being made up on this drum. In the drawing I have illustrated the roller 14 as externally cylindrical and the roller 15 as externally concave for rolling or milling, respectively, the carcass and the tread portions of the tire. It will be understood that the shape and number of these rolls may be varied to meet different requirements. One means of mounting the rollers 14 and 15 so that they may readily be moved toward and away from the periphery of the drum 5 is to mount these rollers on bearing studs 16 and 17 respectively, which are eccentric extensions of shafts 18 and 19. The shafts 18 and 19 are journaled in the frame 10 and have holes 20 for the reception of levers 21 by which they may be oscillated.

In building up a tire casing by my method I take a strip of raw rubber of the form commonly termed capping gum and apply it to the drum 5, by letting said strip pass over the cylindrical roller 14 and be carried around the drum while pressed against the drum by said roller in the manner illustrated in Fig. 5, in the direction shown by the arrows. This applies the raw rubber evenly to the drum without trapping air thereunder. The amount of raw rubber thus applied is the correct amount desired for this part of the tire. As the drum 5 continues to rotate this rubber is gradually rolled out and spread upon the drum in a layer 22 of the desired thickness, the heat of the drum rendering the rubber plastic whereby it will roll out readily and evenly and the rolling of the rubber tending to improve the quality of the same. During this process the edges of the raw rubber will also be pressed into the bead grooves 7. A layer of reinforcing 23 is preferably next applied. This layer of reinforcing is preferably in the nature of cords which extend substantially straight across the tire from one bead portion to the other. At the location of the bead portions these cords are passed around filler members 24 which give body to the tire beads and serve as a means to which the cords are anchored. If two layers of reinforcing cords are used they may pass in opposite directions around the filler member 24 and a chafing strip 25 of fabric or the like may be doubled over the filler members and cords as more clearly shown in Fig. 2. This layer 23 of reinforcing material is applied to the exterior of the layer 22 of raw rubber by passing it over the cylindrical roll 14 and rolling it onto said layer 22 without trapping any air thereunder. The bead portions are rolled onto the grooves 7, pressure being applied from the sides, if necessary, to accomplish this. More raw rubber is then applied to form a tread layer 26, preferably by passing said rubber over one of the rolls 14 or 15 and rolling it onto the tire without forming air pockets then applying the concave roll 15 to roll the tread stock onto the tire evenly and firmly with a thicker central portion.

After a tire has thus been built up in substantially flat form with the material uniformly and evenly distributed it is ready to be shaped to the desired arcuate cross section and then cured. Due to the radial cord form of reinforcing employed in the construction of this tire I find it possible to shape the tire to the desired cross section without creating unequal stresses in different parts of said reinforcing. The process of shaping this tire, however, is not a part of the present invention.

The foregoing description and accompanying drawing clearly disclose a preferred embodiment of my invention but it will be understood that this disclosure is merely illustrative and that such changes in the invention may be made as are fairly within the scope and spirit of the following claims.

I claim:

1. The method of building up a pneumatic tire from raw material which consists in applying the raw material to a circular form which is maintained in a continuously heated condition in use to thereby plasticize said raw material and rolling the plasticized material to a desired shape on said heated form.

2. The method of building up a pneumatic tire casing in a substantially flat cross sectional shape from raw rubber which consists in applying layers of said raw rubber together with reinforcing material to the periphery of a substantially cylindrical drum which is maintained in a continuously heated condition in use and rolling said plastic rubber to a desired shape firmly and evenly onto said heated drum.

3. The method of building up a pneumatic tire casing in a substantially flat form from raw rubber and reinforcing material which consists in applying said raw rubber together with reinforcing material to the periphery of a substantially cylindrical drum which is maintained in a continuously heated condition in use and rolling said rubber on said heated drum firmly and evenly into a desired shape.

4. The method of building up a pneumatic tire casing of raw rubber preparatory to curing the same, which consists in applying a layer of raw rubber to a circular heated form whereby said raw rubber will be rendered plastic, rolling said rubber to a desired shape on said form, applying reinforcing material embodying transverse cords free from longitudinal binder to the exterior of said rubber, rolling said reinforcing material, then applying a layer of raw rubber externally to said reinforcing material and rolling said exterior layer.

5. The method of building up a pneumatic tire casing of a substantially flat cross sectional shape of raw rubber preparatory to curing the same, which consists in applying successive layers of said rubber together with reinforcing material to the peripheral portion of a rotating heated drum whereby said raw rubber is rendered plastic and at the same time applying rolls to the exterior of the rubber on said rotating heated drum whereby said rubber will be rolled and compressed to a desired shape and the layer of rubber next to said drum will be partially cured.

6. The method of applying successive layers of rubber and rubberized cord fabric reinforcing to a rotating form which is maintained in a continuously heated condition in use whereby the formation of air pockets between said layers is avoided, which consists in passing strips of said rubber and cord fabric from which said layers are formed over rolls which are pressed against the rotating form thereby applying said strips evenly and precluding the trapping of air thereunder.

7. Apparatus for forming a pneumatic tire from raw rubber embodying a rotating driven circular form whereon the tire is formed, means for heating said form whereby rubber applied to the periphery thereof will be rendered plastic, and tire milling and forming roller means of substantially smaller diameter than said circular form operatively positioned adjacent the periphery of said circular form and movable into engagement with a tire on said circular form.

8. Apparatus for forming a pneumatic tire of substantially flat cross sectional shape from raw rubber, embodying a rotating driven circular drum whereon the tire is formed, heating means disposed within said drum whereby raw rubber on the exterior of said drum may be rendered plastic, tire milling and forming rollers adjustably mounted adjacent the periphery of said drum, and means for pressing said rollers against the material on said rotating drum.

9. Apparatus for forming a pneumatic tire from raw rubber, embodying a rotating cylindrical drum having a peripheral portion of slightly concave cross sectional shape whereon the tire is formed, heating means disposed within said drum whereby raw rubber on the periphery of said drum will be rendered plastic, and rollers adjustably mounted adjacent the periphery of said drum and movable against the raw rubber on said rotating drum.

10. Apparatus for forming a pneumatic tire from raw rubber, embodying a rotating cylindrical drum having a peripheral portion of slightly concave cross sectional shape with bead receiving recess at the edges thereof whereby a tire may be formed thereon in a substantially flat position, heating means disposed within said drum whereby raw rubber on the exterior of said drum may be rendered plastic, rollers adjustably mounted adjacent the periphery of said drum, and means for applying said rollers against the material on said rotating drum.

ALVIN H. SHOEMAKER.